(12) United States Patent
Vera Martin Del Campo (10) Patent No.: US 10,780,838 B2
(45) Date of Patent: Sep. 22, 2020

(54) HIDDEN EASY BIKE RACK

(71) Applicant: William Vera Martin Del Campo, Salem, OR (US)

(72) Inventor: William Vera Martin Del Campo, Salem, OR (US)

( * ) Notice: Subject to any disclaimer, the term of this patent is extended or adjusted under 35 U.S.C. 154(b) by 0 days.

(21) Appl. No.: 15/589,355

(22) Filed: May 8, 2017

(65) Prior Publication Data

US 2020/0094749 A1    Mar. 26, 2020

(51) Int. Cl.
*B60R 9/06* (2006.01)
*B60R 9/10* (2006.01)

(52) U.S. Cl.
CPC . *B60R 9/10* (2013.01); *B60R 9/06* (2013.01)

(58) Field of Classification Search
CPC .. B60R 9/06; B60R 9/10; B60R 19/48; B60R 5/041; Y10S 224/924
See application file for complete search history.

(56) References Cited

U.S. PATENT DOCUMENTS

| | | | | |
|---|---|---|---|---|
| 7,909,213 B2* | 3/2011 | Bergerhoff | ................ | B60R 9/10 224/197 |
| 9,174,584 B1* | 11/2015 | Cha | ........................... | B60R 9/10 |
| 9,346,412 B2* | 5/2016 | Cha | ........................... | B60R 9/10 |
| 2007/0090142 A1* | 4/2007 | Chuang | .................... | B60R 9/10 224/496 |
| 2008/0142559 A1* | 6/2008 | Lim | .......................... | B60R 9/06 224/489 |
| 2010/0001029 A1* | 1/2010 | Tai | .......................... | B60R 5/041 224/499 |
| 2010/0089957 A1* | 4/2010 | Barth | ....................... | B60R 9/06 224/497 |
| 2011/0108592 A1* | 5/2011 | Lee | .......................... | B60R 9/06 224/488 |
| 2012/0024923 A1* | 2/2012 | Cha | .......................... | B60R 9/06 224/533 |
| 2013/0182454 A1* | 7/2013 | Hofmann | .................. | B60R 9/10 362/549 |
| 2015/0165981 A1* | 6/2015 | Kim | .......................... | B60R 9/06 224/512 |
| 2016/0052458 A1* | 2/2016 | Cha | .......................... | B60R 9/06 414/462 |
| 2016/0052459 A1* | 2/2016 | Cha | .......................... | B60R 9/06 224/489 |
| 2017/0072866 A1* | 3/2017 | Cha | .......................... | B60R 9/06 |

* cited by examiner

*Primary Examiner* — Brian D Nash
(74) *Attorney, Agent, or Firm* — IPS Legal Group, P.A.

(57) ABSTRACT

A bicycle rack built into a vehicle's trunk is provided. In some embodiments, the present invention may comprise a bicycle rack that may slide along one or more tracks built into a vehicle's trunk, wherein the bicycle rack may extend from or retract into the vehicle's trunk. In some embodiments, the movement of the bicycle rack along the tracks may be automated according to one or more built-in features of the vehicle.

5 Claims, 10 Drawing Sheets

HIDDEN EASY BIKE RACK

CROSS-REFERENCE TO RELATED APPLICATION

This application does not claim priority to any prior U.S. Provisional Application.

TECHNICAL FIELD

The present invention relates generally to the field of bicycle racks and more specifically relates to a bicycle rack built into a vehicle's trunk.

BACKGROUND

Although bicycles are themselves modes of transport, often times a user is required to transport the bicycle somewhere before the intended cycling can begin. For example, a user may want to drive to a trail, then ride a mountain bicycle on the trail. In other instances, a person may want to transport a bicycle a long distance for a purpose other than riding the bicycle, such as when a person moves houses and takes their belongings from one place to another.

No matter the purpose, transporting a bicycle on a bicycle rack is often difficult. Most bicycle racks require either permanent installation or can be attached and detached from a car, and almost all require extensive assembly. If in the form of a roof rack, the permanent bicycle rack requires the user to be able to place the bicycle on the roof of the automobile. If mounted to a car's frame, the permanent bicycle rack requires installation of a tow hitch. Either way, permanent racks are costly.

Impermanent or "as-needed" bicycle racks are little better. These can also be costly, heavy, and unwieldy. They can also take a long time to attach and detach. As well, these racks run a larger risk of coming detached from the vehicle. Lastly, many such models require large amounts of storage room when they are not in use.

Various attempts to solve this problem have been made. One such attempt can be seen with respect to U.S. Pat. No. 4,676,413 incorporated by reference in its entirety herein, which generally discloses a traditional "permanent" bicycle rack. This disclosure reveals the extent of installation and the types of equipment necessary to mount a permanent bike rack on a vehicle.

Another attempt can be seen with respect to U.S. Patent Application Publication No. 2002/0117524 A1 incorporated by reference in its entirety herein, which generally discloses a traditional "impermanent" or "as-needed" bicycle rack. As can be seen, these types of disclosures require a variety of straps, levers, and padding elements to be in just the right place for the disclosure to perform properly. Unfortunately, these types of disclosures are heavy and unwieldy and require large amounts of space for storage when the unit is not in use.

A related attempt can be seen with respect to U.S. Pat. No. 7,237,817, also incorporated by reference in its entirety herein, which generally discloses a roll-out truck bed. While different from a bicycle rack, it nonetheless discloses a roll-out system that indicates some ways in which a roll-out system could be implemented. Of course, this disclosure fails to provide for a bicycle rack configuration.

A step closer can be seen with respect to U.S. Pat. No. 6,474,715, also incorporated by reference in its entirety herein, which discloses an extendable flat bed element for use with luggage. While also not configured to retain bicycles, this disclosure takes the extendable surface concept to a passenger vehicle context, and yet still fails to provide for a specifically bicycle-appropriate configuration.

As can be seen, various attempts have been made to solve the problems which may be found in the related art but have thus far been unsuccessful. A need exists for a new bicycle rack built into a vehicle's trunk to avoid the above-mentioned problems.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

The present invention relates to a bicycle rack built into a vehicle's trunk that overcomes the deficiencies of the prior art. It is contemplated that the present invention may provide a bike rack that is easy to use and is always available.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention provides a bicycle rack built into a vehicle's trunk. The general purpose of the present invention, which will be described subsequently in greater detail, is to provide a bicycle rack built into a vehicle's trunk that can be extended or retracted as needed. The features of the invention which are believed to be novel are particularly pointed out and distinctly claimed in the concluding portion of the specification. These and other features, aspects, and advantages of the present invention will become better understood with reference to the following drawings and detailed description.

In one embodiment, the present invention may provide for a bicycle carrier hidden in the trunk of any vehicle and that can be extended and used or stored away in seconds. More specifically, it is easy to extend or retract, which can be done in seconds, and that when stowed away in the vehicle is permanently hidden in the trunk. Additionally, the present invention may prevent theft.

In some embodiments, the present invention may provide for two extendable arms, linked by a center member. In some embodiments, the center member's outside, when the present invention is retracted, my match the style and appearance of the rest of the car's trunk. The present invention may also provide for extendable gears or machinery configured to extend and retract the extendable arms as desired by a user. In some embodiments, the extendable arms may have an upper surface, on which may be one or more receiving and retaining elements configured to releasably secure one or more bicycles.

To use the invention, the user may press a button or otherwise activate the present invention, whereupon the extendable arms may extend laterally away from the vehicle. Once the extendable arms are fully extended or otherwise in place, a user may attach a bicycle to the present invention using the one or more receiving and retaining elements. To put the present invention back inside the vehicle, a user may simply press a button or otherwise cause the present invention to retract and generally reverse its movements.

In some embodiments, the present invention may also provide for one or more sets of instructions embedded into one or more non-transitory computer-readable mediums, wherein the instructions are operative to cause a system to cause a motor to extend or retract a bicycle rack along one or more tracks.

In some embodiments, the present invention may be provided as an installed feature of new vehicles. In other embodiments, the present invention may be installed as an after-market feature in a vehicle.

In some embodiments, the present invention may comprise a bicycle rack built into a vehicle having a two cylindrical support members, each having an upper side, an interior side, and a "terminus," meaning the closest end to the vehicle. Each of the cylindrical members may have a hole in its interior side, wherein the end portion of a support element may attach and in some embodiments may rotate around, in, or through. The present invention may provide for a rear element that has an outer or outside surface that may be painted or otherwise configured to match a vehicle's exterior. And, the present invention may also provide for one or more bicycle clamps fixedly attached to the support members' upper sides. In some embodiments, these bicycle clamps are detachable, and in some embodiments they are configured to lay flat when not in use. In some embodiments, a motor may extend the support members and support member(s) from within or out from the vehicle, and in some embodiments the motor may retract the support members and support member(s) into the vehicle.

The unique features of the present invention may provide the following benefits for one or more consumers: because it is installed in a vehicle, it is nearly always available, is secure, and quite easy to use.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and more effective bicycle rack.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising," "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well known features, elements or techniques may not be shown in detail in order not to obscure the embodiments.

Figure 1:
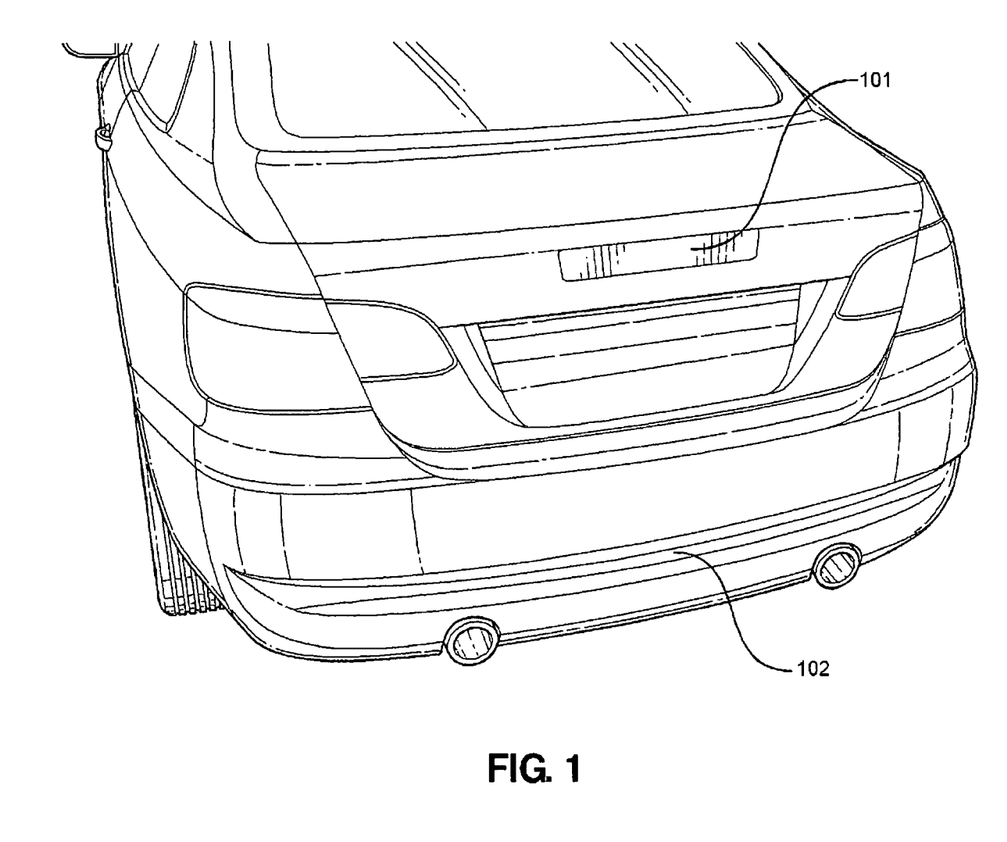
FIG. 1 shows a perspective view of a bicycle rack built into a vehicle's trunk in accordance with one embodiment of the invention.

With respect to FIG. 1, a perspective view of a bicycle rack built into a vehicle's trunk in accordance with one embodiment of the invention can be seen. In the embodiment disclosed, a user may perceive hidden bike rack built into car 101 and car 102.

Figure 2:
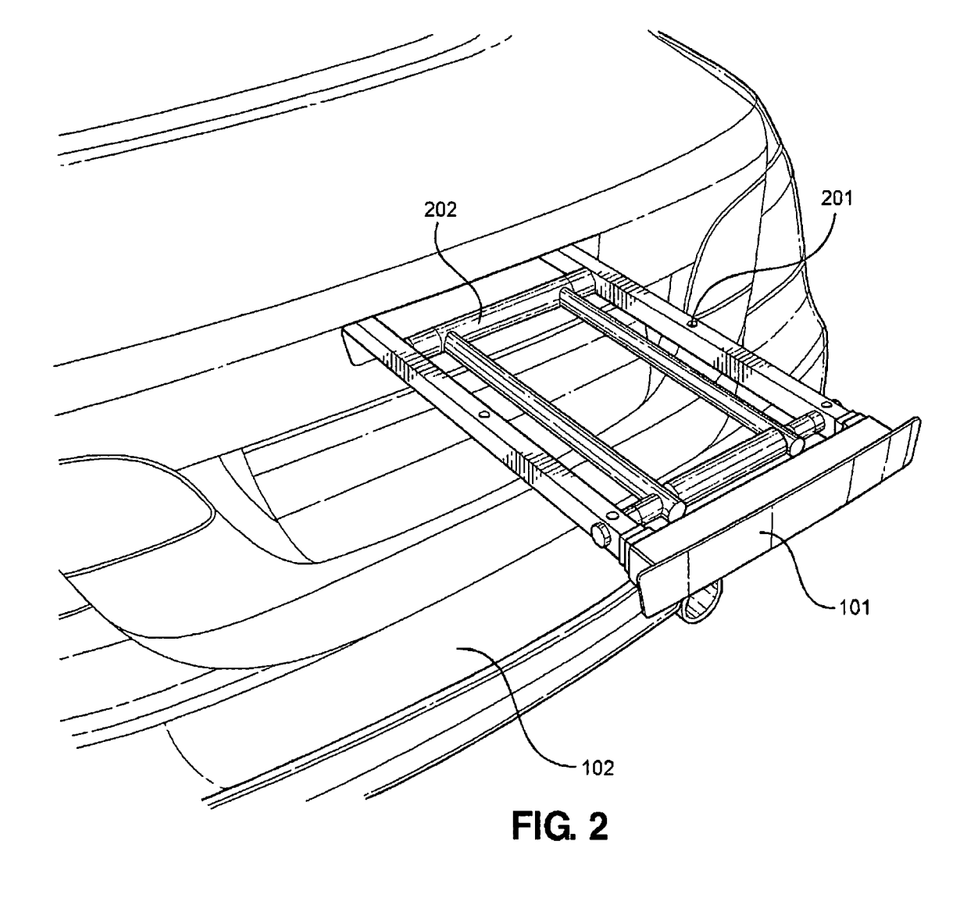
FIG. 2 shows another perspective view of a bicycle rack built into a vehicle's trunk in accordance with one embodiment of the invention.

With respect to FIG. 2, a perspective view of a bicycle rack built into a vehicle's trunk in accordance with one embodiment of the invention can be seen. In the embodiment disclosed, a user may perceive holes for detachable bike clamps 201 and support bar extension 202, as well as hidden bike rack built into car 101 and car 102.

Figure 3:
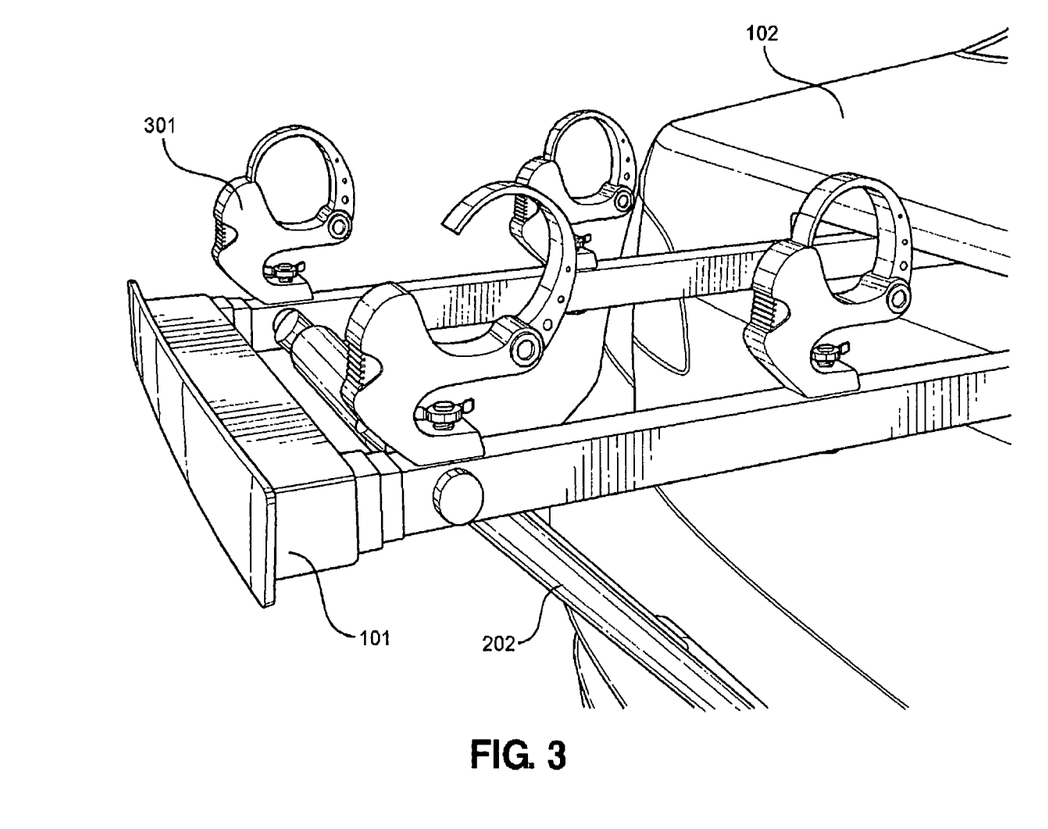
FIG. 3 shows another perspective view a bicycle rack built into a vehicle's trunk in accordance with one embodiment of the invention.

With respect to FIG. 3, a perspective view of a bicycle rack built into a vehicle's trunk in accordance with one embodiment of the invention can be seen. In the embodiment disclosed, a user may perceive detachable bike clamps 301, as well as hidden bike rack built into car 101, car 102, and support bar extension 202.

Figure 4:
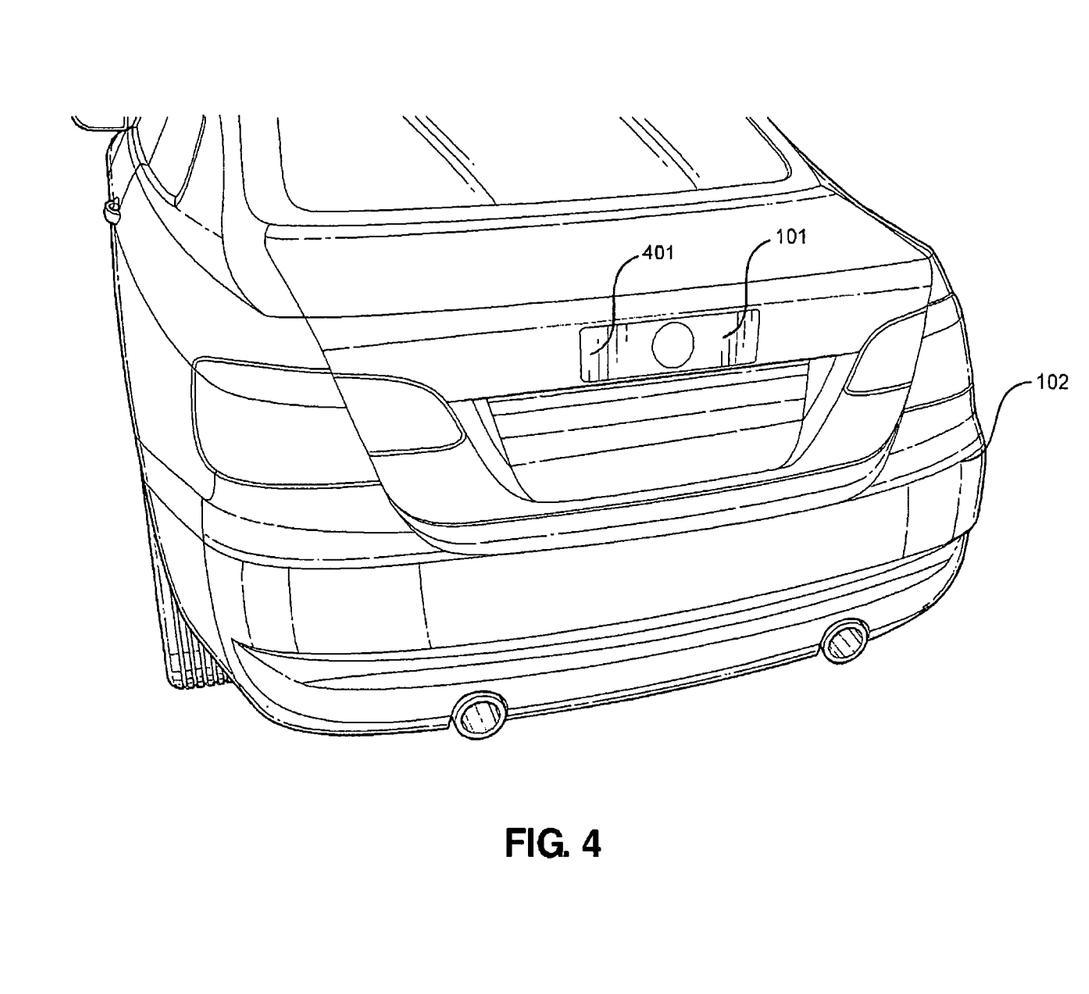
FIG. 4 shows another perspective view a bicycle rack built into a vehicle's trunk in accordance with one embodiment of the invention.

With respect to FIG. 4, a perspective view of a bicycle rack built into a vehicle's trunk in accordance with one embodiment of the invention can be seen. In the embodiment disclosed, a user may perceive rear segment 401, along with hidden bike rack built into car 101 and car 102. In some embodiments, rear segment 401 may be bigger to hold different car badges.

Figure 5:
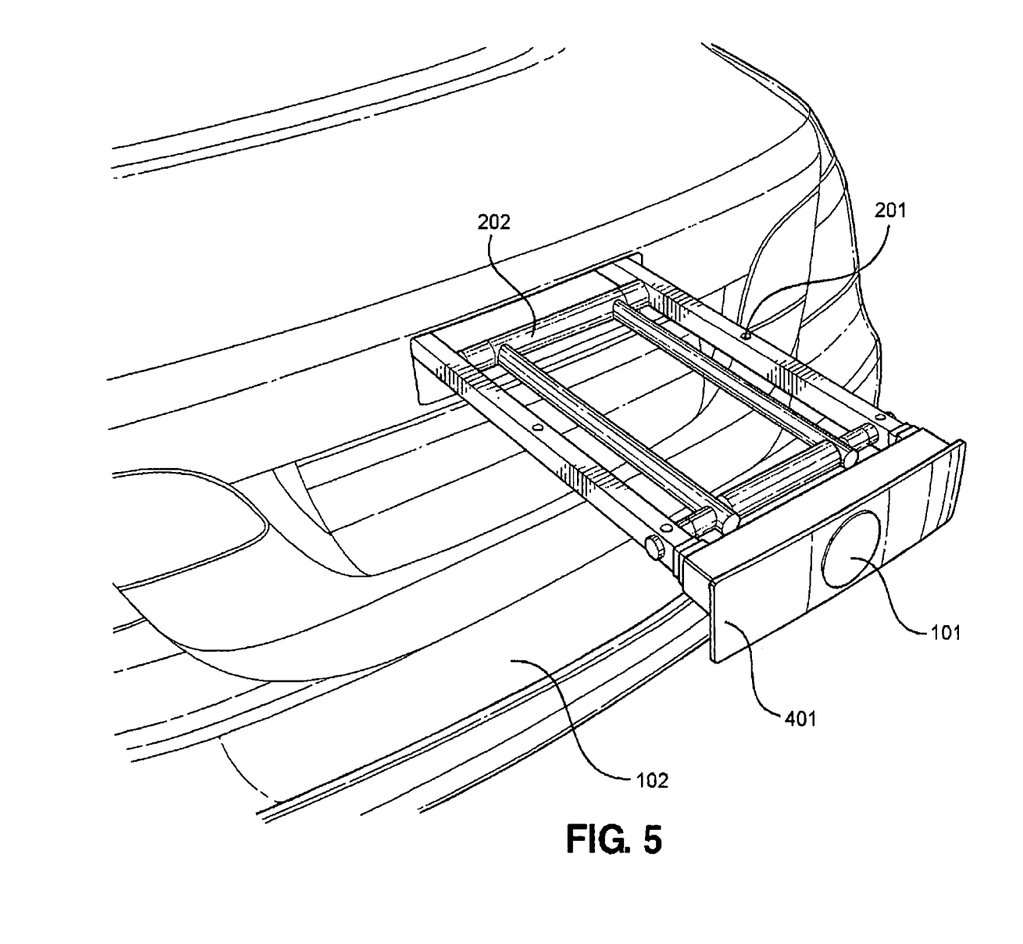
FIG. 5 shows another perspective view a bicycle rack built into a vehicle's trunk in accordance with one embodiment of the invention.

With respect to FIG. 5, a perspective view of a bicycle rack built into a vehicle's trunk in accordance with one embodiment of the invention can be seen. In the embodiment disclosed, a user may perceive hidden bike rack built into car 101, car 102, detachable bike clamps 201, support bar extension 202, and rear segment 401.

Figure 6:
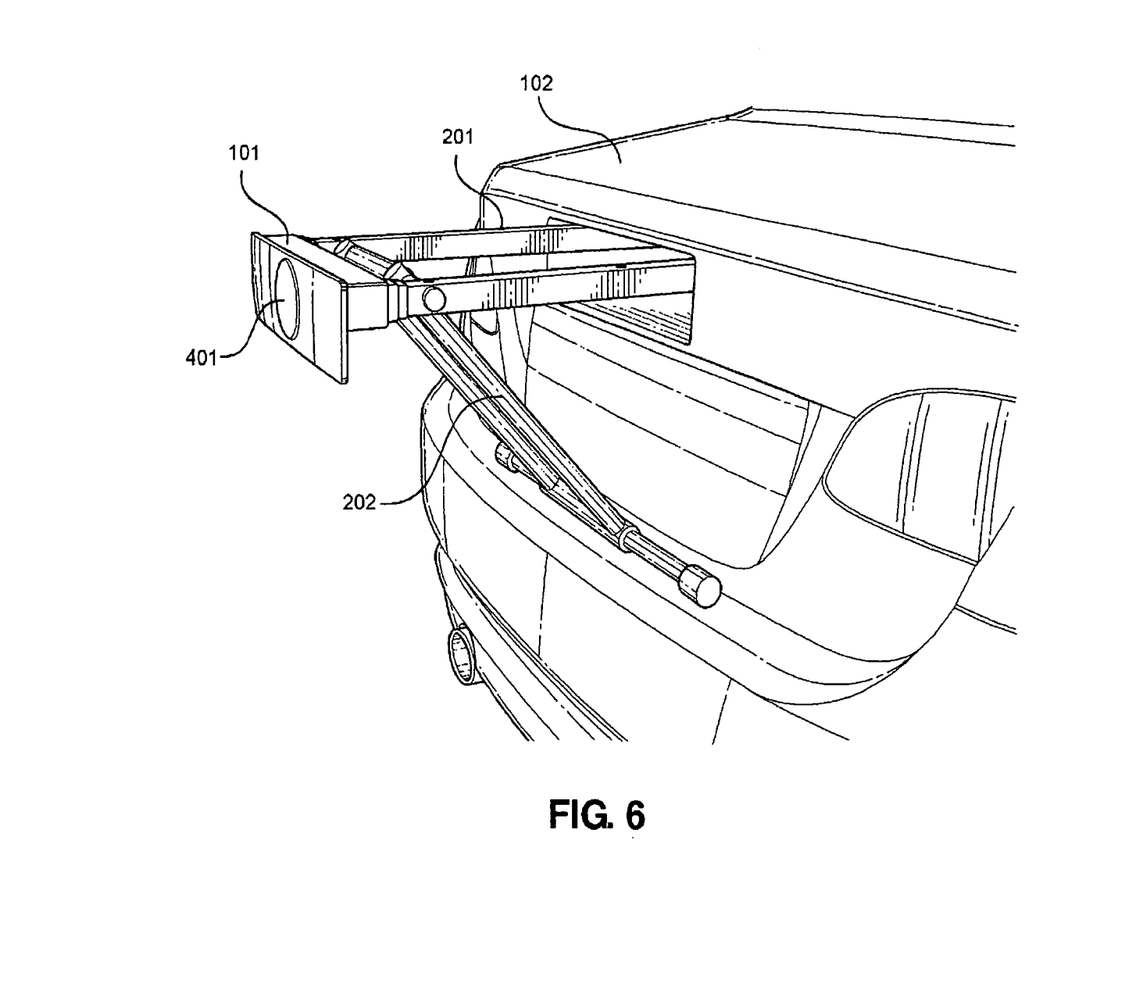
FIG. 6 shows another perspective view a bicycle rack built into a vehicle's trunk in accordance with one embodiment of the invention.

With respect to FIG. 6, a perspective view of a bicycle rack built into a vehicle's trunk in accordance with one embodiment of the invention can be seen. In the embodiment disclosed, a user may perceive hidden bike rack built into car 101, car 102, detachable bike clamps 201, support bar extension 202, and rear segment 401.

Figure 7:
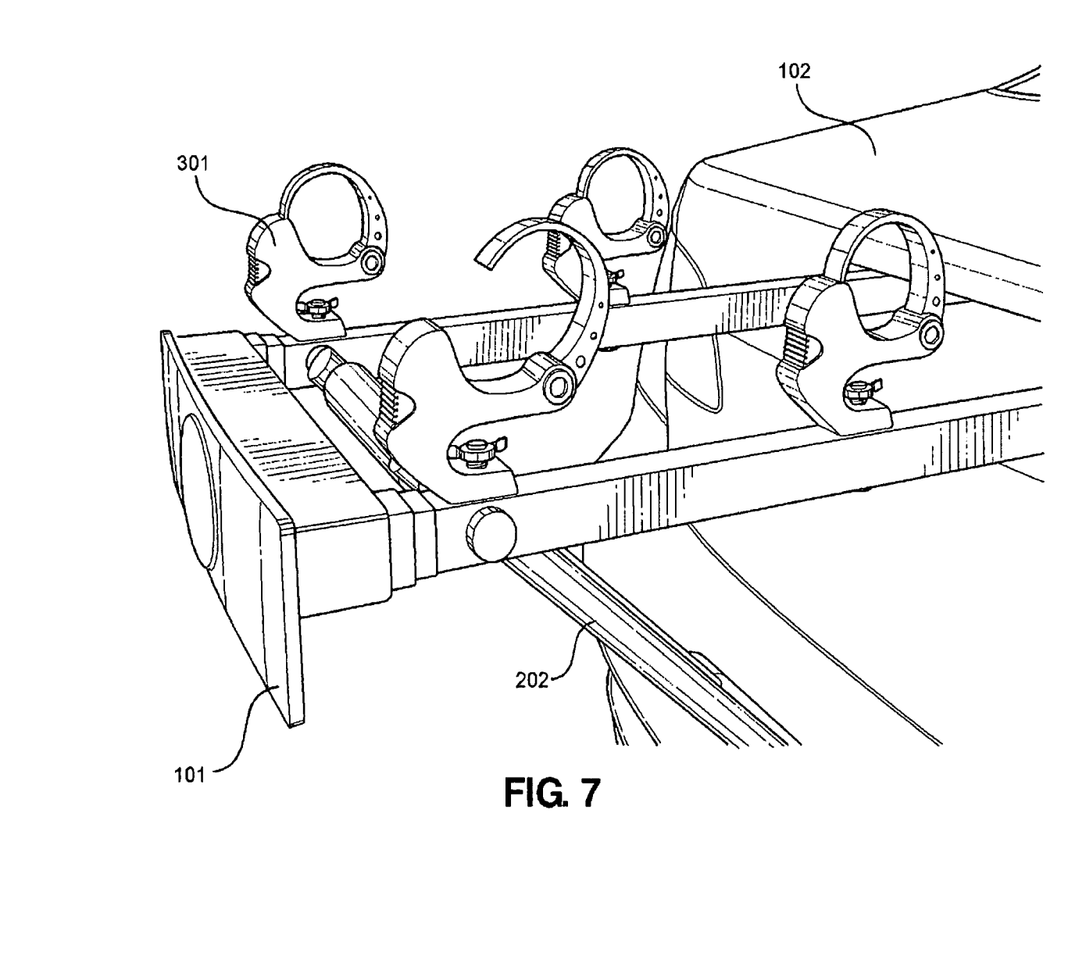
FIG. 7 shows another perspective view a bicycle rack built into a vehicle's trunk in accordance with one embodiment of the invention.

With respect to FIG. 7, a perspective view of a bicycle rack built into a vehicle's trunk in accordance with one embodiment of the invention can be seen. In the embodiment disclosed, a user may perceive hidden bike rack built into car 101, car 102, support bar extension 202, and detachable bike clamps 301.

Figure 8:
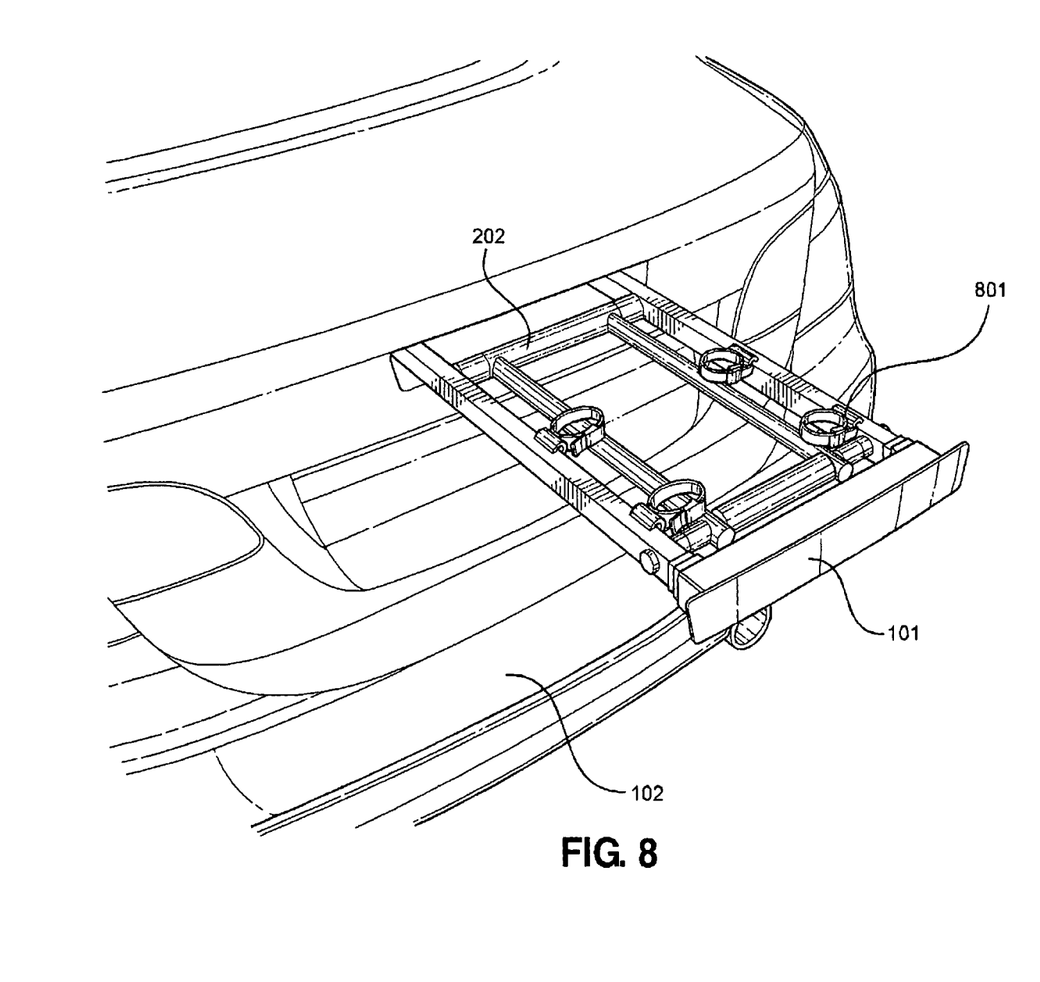
FIG. 8 shows another perspective view a bicycle rack built into a vehicle's trunk in accordance with one embodiment of the invention.

With respect to FIG. 8, a perspective view of a bicycle rack built into a vehicle's trunk in accordance with one embodiment of the invention can be seen. In the embodiment disclosed, a user may perceive detachable bike clamps fold down when not in use 801, as well as hidden bike rack built into car 101, car 102, and support bar extension 202.

Figure 9:
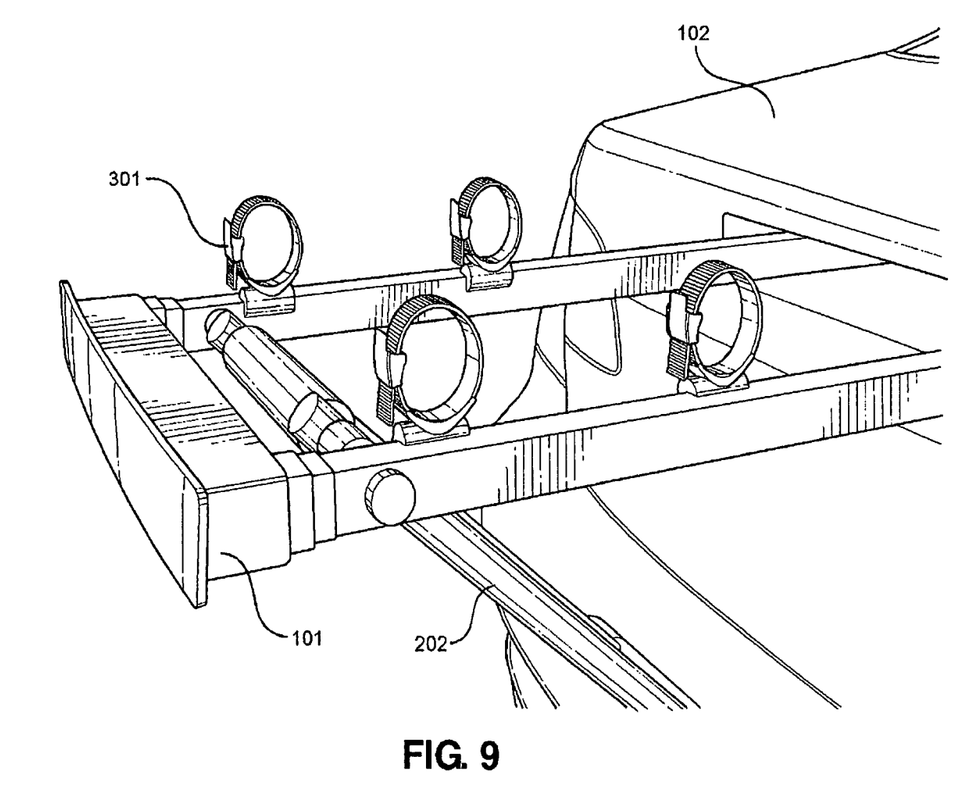
FIG. 9 shows another perspective view a bicycle rack built into a vehicle's trunk in accordance with one embodiment of the invention.

With respect to FIG. 9, a perspective view of a bicycle rack built into a vehicle's trunk in accordance with one embodiment of the invention can be seen. In the embodiment disclosed, a user may perceive hidden bike rack built into car 101, car 102, support bar extension 202, and detachable bike clamps 301.

Figure 10:
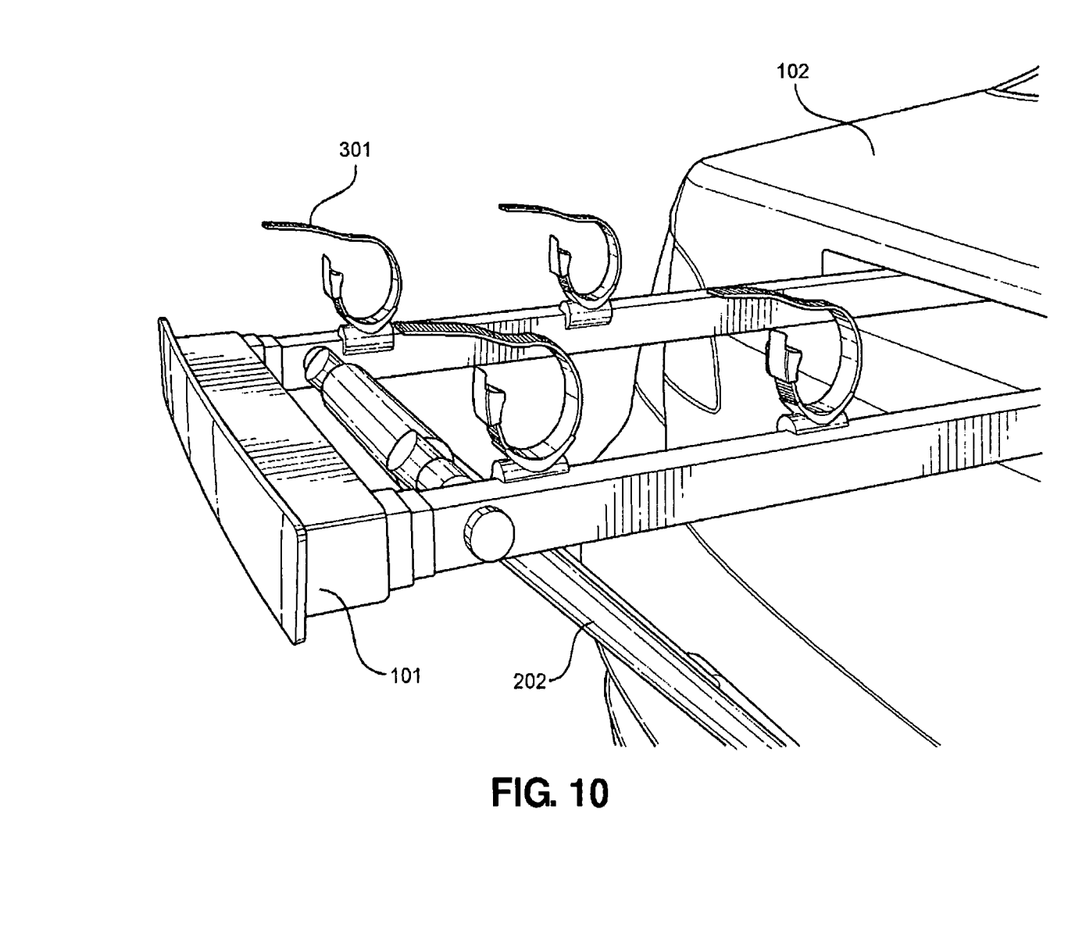
FIG. 10 shows another perspective view a bicycle rack built into a vehicle's trunk in accordance with one embodiment of the invention.

With respect to FIG. 10, a perspective view of a bicycle rack built into a vehicle's trunk in accordance with one embodiment of the invention can be seen. In the embodiment disclosed, a user may perceive hidden bike rack built into car 101, car 102, support bar extension 202, and detachable bike clamps 301.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the bicycle rack built into a vehicle's trunk generally described herein has been disclosed in connection with a number of embodiments shown and described in detail, various modifications should be readily apparent to those of skill in the art.

What is claimed is:

1. A bicycle rack built into a trunk of a vehicle, comprising:
    a first cylindrical support member having a first upper side, a first interior terminus, a first interior side and a first exterior side, the first interior side having at least one first hole;
    a second support member having a second upper side, a second interior terminus, a second interior side and a second exterior side, the second interior side having at least one second hole;
    a support element having at least one arm and a cylindrical center, the cylindrical center member having two ends, the first end configured to fixedly connect into the first hole, the second end configured to fixedly connect into the second hole;
    a rear element having an outer surface;
    one or more bicycle clamps fixedly connected to the first upper side; and
    one or more bicycle clamps fixedly connected to the second upper side.

2. The bicycle rack of claim 1, wherein the first interior terminus and the second interior terminus are configured to slide along one or more tracks, wherein the one or more tracks are configured to enable the first support member and the second support member to retract within the trunk of a vehicle.

3. The bicycle rack of claim 2, wherein the one or more tracks are configured to enable the first support member and the second support member to extend from within the trunk of a vehicle.

4. The bicycle rack of claim 3, further providing a motor, wherein the motor is configured to extend the first support member and the second support member from within the trunk of a vehicle.

5. The bicycle rack of claim 2, further providing a motor, wherein the motor is configured to retract the first support member and the second support member within the trunk of a vehicle.

* * * * *